(12) United States Patent
Kramer et al.

(10) Patent No.: US 8,103,519 B2
(45) Date of Patent: Jan. 24, 2012

(54) SYSTEM FOR MARKETING CAMPAIGN SPECIFICATION AND SECURE DIGITAL COUPON REDEMPTION

(75) Inventors: James F. Kramer, Foster City, CA (US); Paul C. Ning, Foster City, CA (US)

(73) Assignee: Hoozware, Inc., Foster City, CA (US)

( * ) Notice: Subject to any disclaimer, the term of this patent is extended or adjusted under 35 U.S.C. 154(b) by 364 days.

(21) Appl. No.: 12/182,592

(22) Filed: Jul. 30, 2008

(65) Prior Publication Data

US 2009/0024477 A1 Jan. 22, 2009

Related U.S. Application Data

(63) Continuation-in-part of application No. 12/161,554, filed as application No. PCT/US2007/061328 on Jan. 30, 2007, now Pat. No. 7,856,360, which is a continuation-in-part of application No. 11/307,262, filed on Jan. 30, 2006, now Pat. No. 7,788,188.

(60) Provisional application No. 60/823,573, filed on Aug. 25, 2006.

(51) Int. Cl.
*G06Q 10/00* (2006.01)
*G06Q 30/00* (2006.01)
*G06Q 99/00* (2006.01)

(52) U.S. Cl. ............ 705/1.1; 705/14.58; 705/319
(58) Field of Classification Search .......... 705/1.1, 705/319, 14.1
See application file for complete search history.

(56) References Cited

U.S. PATENT DOCUMENTS

| | | | | |
|---|---|---|---|---|
| 2004/0093281 | A1* | 5/2004 | Silverstein et al. | 705/26 |
| 2006/0015404 | A1* | 1/2006 | Tran | 705/14 |
| 2009/0070230 | A1* | 3/2009 | Silverstein et al. | 705/26 |
| 2009/0254971 | A1* | 10/2009 | Herz et al. | 726/1 |

* cited by examiner

*Primary Examiner* — Jonathan Ouellette

(57) ABSTRACT

Product vendors are provided with a system for performing a marketing campaign to mobile communication device users, providing offers as instruments, such as digital coupons, to a selected group of users of the mobile communication devices and validating the integrity of the instruments. The invention has two phases: the selection of the components of the instrument from a menu provided by a social networking organization; and validating the instrument upon redemption from the product vendor. In the first phase, the product vendor selects elements from the menu relevant to the campaign, such as timing, nature of the offer, targeting of the recipients, etc. In the second phase, the instrument is encoded as to the marketing campaign and an arbitrary designation which initiates a pattern as the instrument is redeemed. The product vendor inspects the instrument to ensure that the encoding is correct during the redemption process.

16 Claims, 1 Drawing Sheet

SYSTEM FOR MARKETING CAMPAIGN SPECIFICATION AND SECURE DIGITAL COUPON REDEMPTION

CROSS REFERENCE TO RELATED APPLICATIONS

This application claims priority to U.S. patent application Ser. No. 12/161,554, filed on Jul. 18, 2008, which is a U.S. national stage filing under 35 USC 371 of PCT application number PCT/U.S.07/61328 filed on Jan. 30, 2007, which is a continuation in part of U.S. patent application Ser. No. 11/307,262, filed on Jan. 30, 2006 and which PCT application is a non-provisional patent application of U.S. provisional application No. 60/823,573, filed on Aug. 25, 2006, which are incorporated herein by reference in their entirety.

TECHNICAL FIELD

The field of this invention is digital coupons.

BACKGROUND

Historically coupons came in the form of paper documents, often being combined with daily or weekly newspapers or monthly magazines. With the advent of the internet and digital media, we can now have paperless, digital coupons. Such digital coupons bring many potential advantages including flexibility in scheduling, when to send out time-sensitive digital coupons, low cost and ease of digital coupon dissemination. Digital coupons can even be sent to a mobile phone. This new digital media creates a need to specify in a manageable way when digital coupons should be sent out. Digital coupons also introduce added security risks requiring novel approaches.

SUMMARY OF THE INVENTION

An interface is presented whereby a product vendor can specify timing aspects regarding a promotional instrument for its products, such as a digital coupon. Employing the subject invention, the timing aspects of such an instrument that a vendor can specify typically include such things as the start date, start time, end time and when to send out the instrument to prospective product consumers. Importantly, the vendor can also specify a recurrence timing aspect for an instrument that includes a recurrence pattern, a recurrence range for when to end the recurrence and how to send out the recurring instrument.

The integrity of instruments on mobile phones is protected by employing a coding system. The subject invention coding system comprises reference numbers and sequence numbers. Presentation of the instrument to a recipient product vendor follows a protocol, including evaluation of the instrument to determine validity followed by redemption of a valid instrument.

BRIEF DESCRIPTION OF THE DRAWINGS

FIG. 2A is a non-redeemed digital coupon and FIG. 2B is a redeemed digital coupon.

DETAILED DESCRIPTION OF THE INVENTION

Figure 1:
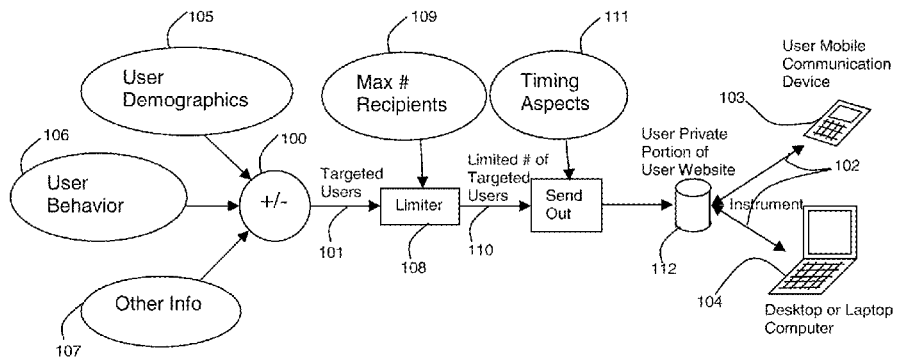
FIG. 1 is a block diagram providing how recipients are selected and limited to a desired number, and how selected recipients view instruments using a mobile communication device and/or desktop or laptop computer.

In accordance with the subject invention, product vendors are provided with a system for performing a marketing campaign to mobile communication device users, providing offers as instruments, such as digital coupons, to a selected group of users of the mobile communication devices and validating the integrity of the instruments. The invention has two phases: the selection of the components of the instrument from a menu provided by a social networking organization; and validating the instrument upon redemption from the product vendor. The social networking organization maintains a data base managed by a data processor, e.g., computer server. In the first phase, the product vendor selects elements from the menu relevant to the campaign, such as timing, nature of the offer, restrictions to the offer, targeting of the recipients, etc. In the second phase, the instrument is encoded as to the marketing campaign and an arbitrary designation which initiates a pattern as the instrument is redeemed. The product vendor inspects the instrument to ensure that the encoding is correct before and after redeeming the instrument.

In the first phase, the product vendor, who also serves as the award provider, is provided a menu from the social networking organization for defining the nature of the marketing campaign. The social networking organization has members and has the data base on the computer server with member demographics, behavior and use of product vendors. Instruments are provided to the members by way of an offer from the product vendor. The menu contains an extensive list of components to be selected by the product vendor in launching the marketing campaign. The elements from the menu include the timing of the offer, the subject matter of the offer, and the characteristics of the members to receive the instrument.

The timing aspects typically include the start date, start time, end time and when to make the instrument available to recipients. The timing aspects may also include recurrence information, such as a recurrence pattern, when to end the recurrence and when to make the recurring instrument available to recipients. Being able to specify timing aspects of an instrument is very valuable. In particular, it allows a vendor to send out instruments or to have them be valid during a known time of the day when business is slow. A vendor may even send out instruments immediately when the vendor sees that business is slow at any given time in order to smooth out business traffic. An instrument such as a digital coupon has clear advantages over the lack of flexibility of timing aspects of other marketing media such as newspapers, radio, TV, and the like.

The instrument includes the type of offer being made and what item or items it covers. It can also include the time in which redemption of the instrument can be made.

The instrument may be presented as a digital coupon for redemption of an award. Details of the instrument are indicated on the display of a mobile communication device. For example, the computer server may generate the instrument as a text message or email sent to a mobile phone, or send the instrument as a web page to be rendered on a mobile phone. The user of the mobile phone may then show the instrument to a vendor who provides the award to the user.

A mobile communication device includes, but is not limited to, a mobile phone, a mobile computer, a pager or any other wireless device capable of receiving an instrument signal and interacting with the user, such as a product consumer or social networking organization member, in order to redeem the instrument.

FIG. 1 is a block diagram showing selection 100 of targeted users 101 to receive an instrument 102 and how such users access the instrument using a variety of devices 103 and 104. To select targeted users 101 a vendor may select from a variety of user demographics 105 and user behavior 106, and may further select based on other information 107. User demographics 105 may include, but is not limited to, gender, age, residence distance from the vendor, whether the user has indicated that the vendor is a favorite, user interests, whether the user is a student, user sexual orientation and user income level. User behavior 106 may include, but is not limited to, whether the user has visited the vendor and when, whether the user has visited another vendor and when, whether the user has an alert set to notify them if they receive an instrument from the vendor, whether the user has done a recent search that ranks the vendor, user drinking frequency and whether the user might be interested in a singles night. Other information 107 the vendor may use to select targeted user includes, but is not limited to, a customized list of users, and the popularity or social status of users as determined by other users.

The vendor may then limit 108 the resulting list of targeted users by selecting a maximum number of users 109. A limited list of targeted users 110 is then created from the non-limited list of targeted users 101. To create the limited list of targeted users 110, typically targeted users are selected at random from the non-limited list of targeted users 101 until the maximum number of users 109 is reached.

The vendor then specifies the timing aspects 111 of the instrument 102. Such specification may include, but is not limited to start date, start time, end time and whether to send out the offer now or a specified amount of time before the start time. The vendor may also specify that the instrument recurs.

If recurrence is specified, the vendor typically must further select the recurrence pattern, range and how to send out the instrument, such as one per recurring day, one per recurring week or only once covering all recurring days. Typically the recurrence pattern may be daily, weekly, monthly or yearly. If daily is selected, typically the vendor may select a pattern of every so many days or every weekday. If weekly is selected, typically the vendor may select a pattern of every so many weeks or may specifically select which days of the week are to be included in the pattern. If monthly is selected, typically the vendor may select which days of which months are to be included in the pattern. If yearly is selected, typically the vendor may select which days of which months are to be included in the pattern.

The range timing aspect typically allows the vendor to specify that the instrument recurrence has no end date, ends after a set number of patterns or ends after a set date.

Typically the vendor can specify how to send out the instrument by selecting whether to send out one instrument per recurring day or to send out one instrument covering all recurring days.

Sending out the instrument typically includes making the instrument available to each of the limited targeted users 110 by allowing each to view the instrument on their own private portion of the user website 112. The private portion may take the form of a private account on the computer server. Viewing of the instrument is typically achieved using a user mobile communication device 103 or desktop or laptop computer 104.

The vendor will also define the nature of the offer, namely the type and item, such as two drinks for the price of one, free admission or no service charge where there are normally charges, 10% discount on beer and/or wine, etc.

Once the mobile-communication-device user has received the instrument, they may then proceed to redeem the instrument in accordance with its terms. The instrument is then presented to the product vendor/award provider for redemption. A system and method is provided for the award provider to ensure the integrity of the instrument. The method employs the computer server which provides two separate websites, one for award providers (the award-provider website) and one for users of mobile communication devices (the user website) who are prospective recipients of instruments. Each award provider has its own private portion of the award provider website; each user has its own private portion of the user website.

The following validation system that is described finds use not only with the marketing campaign described above, but also with other digital coupon redemptions.

When the mobile-communication-device user presents the mobile communication device showing the instrument to the award provider, the award provider checks the instrument for its validity. The instrument is coded to prevent counterfeiting, such as unauthorized creation of an instrument by other than the award provider, or recreating or copying a valid instrument. The instrument code also prevents unlicensed repetitive use of a valid instrument.

Besides the components described above, an instrument typically includes a description of the award, the name of the award provider, the period that the award is valid, the current time, a reference designator and a sequence designator. Typically the reference and sequence designators don't appear on an unredeemed instrument; they appear on a redeemed instrument and are viewable on the award-provider website. The reference designator represents a family of instruments, such as instruments associated with a marketing campaign of the award provider. The reference designator will typically have from 3 to 8 symbols, conveniently 5 symbols, which are typically 5 numbers. For a specific family of instruments the reference designator is typically chosen at random from a range of reference designators. A random reference designator is typically chosen for each family, although over extended periods of time the reference designator may be repeated.

Redemption involves displaying the instrument to the award provider and then requesting redemption using the mobile communication device. Typically, the reference and sequence designators will then be indicated and associated with the instrument along with the time of redemption and the time since redemption. As indicated above, when redeemed, the reference and sequence designators appear on the display of the mobile communication device comprising the instrument. Also, some indication of the fact of redemption will usually appear, e.g., the term "redeemed."

When the instrument is redeemed, it is assigned a unique sequence designator, which typically appears on the display comprising the redeemed instrument. The initial sequence designator for a given reference designator is chosen at random from a range of sequence designators. After the first redemption, each sequence designator for other redeemed instruments associated with the same reference designator is incremented in accordance with a predetermined pattern.

The award provider inspects the unredeemed instrument and upon redemption confirms the validity of the instrument. Confirmation may include:

1. assuring that the display appears valid;
 2. confirming that the redemption time and time since redemption are reasonable;
 3. confirming that the reference designator is valid;

4. checking whether the sequence designator appears proper for the given reference designator, e.g.,
   a. the sequence designator is in the correct range;
   b. the sequence designator tracks with a previous sequence designator, particularly the immediately previous sequence designator;
5. having the mobile-communication-device user communicate with the user website and request redisplay of the redeemed instrument;
6. checking the award-provider website to confirm it shows the same reference designator, sequence designator, time of redemption and time since redemption; and
7. having the mobile-communication-device user communicate with the user website to request that the user website communicate instrument and other information to the award provider including: the reference designator, the sequence designator, time of redemption, time since redemption and optionally identifying information concerning the identity of the mobile-communication-device user.

Figures 2A, 2B:
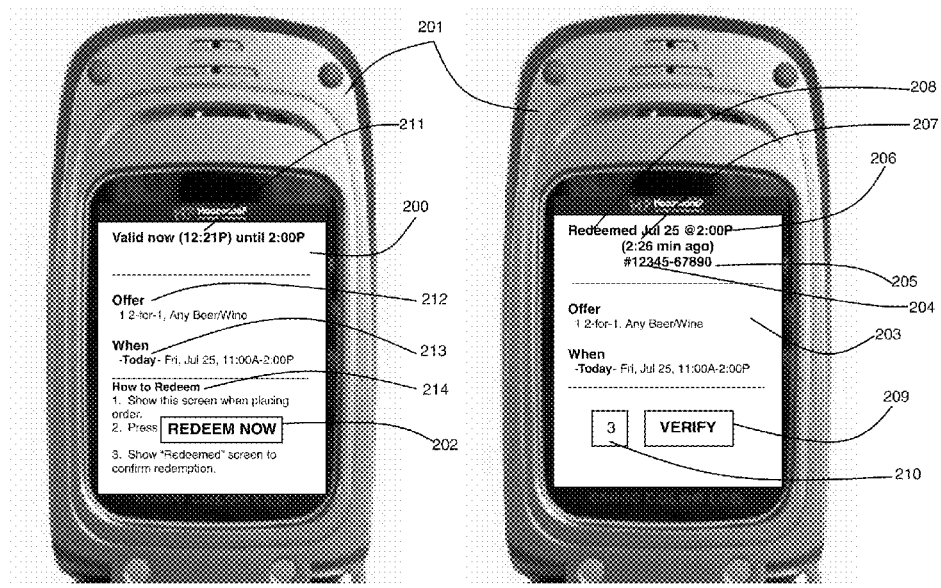
FIGS. 2A and 2B provide exemplary displays of an instrument such as a digital coupon.

For further understanding of the invention a useful embodiment is provided in FIGS. 2A and 2B showing exemplary displays on a mobile communication device of an unredeemed instrument and a redeemed instrument, respectively. The instrument shown is a digital coupon displayed on a mobile phone. See also PCT application no. PCT/US07/61328.

The embodiment involves a vendor such as a venue (i.e., the award provider), such as a bar, nightclub or lounge, that is associated with a social networking organization comprising members (i.e., users) who use mobile phones (i.e., mobile communication devices) and who attend venues. The social networking organization has a computer server. The venue defines a marketing campaign on the social networking organization computer server to offer a drink discount to selected members (see also targeted users 101 in FIG. 1) of the social networking organization. The social networking organization computer server then transmits a digital coupon (i.e., the instrument), typically by sending web-page instructions, a text message or email to the mobile phones (see also user mobile communication device 103 of FIG. 1) of the selected members of the social networking organization offering such members the drink discount at the venue.

To redeem the drink discount, the member goes to the venue and shows the unredeemed digital coupon 200 on their mobile phone 201 to a venue bartender. The unredeemed digital coupon 200 may display a 5-digit reference number (i.e., the reference designator) corresponding to the marketing campaign, but typically, the 5-digit reference number is only displayed on a redeemed digital coupon. The unredeemed digital coupon 200 also displays the period that the award is valid and the current time 211. The unredeemed digital coupon 200 (as well as the redeemed digital coupon) also shows the nature of the offer, such as the offer type 212 and offer item 213. The unredeemed digital coupon 200 typically also provides the protocol 214 for redeeming the coupon, such as the steps: (1) Show this screen when placing order, (2) Press "REDEEM NOW," and (3) Show "Redeemed" screen to confirm redemption.

After the member shows the unredeemed digital coupon 200 on their mobile phone 201 to the venue bartender, the venue bartender inspects the unredeemed digital coupon 200 to make sure it looks authentic. If a reference number is displayed on the unredeemed digital coupon 200, the venue bartender checks that the reference number is the correct number for the venue's marketing campaign. The member then selects the redemption link 202 associated with the digital coupon.

A redeemed digital coupon 203 is then displayed in place of the unredeemed digital coupon 200, and the redeemed digital coupon 203 then displays the 5-digit reference number 204 as well as a 5-digit sequence number (i.e., the sequence designator) 205, the redemption time 206, time since redemption 207 and an indicator of redemption, e.g. the word "Redeemed" 208. The sequence number will start from a random seed and then be incremented by one each time a digital coupon for the same marketing campaign is redeemed.

Before the drink discount is applied to the drink order, the venue bartender checks the digital coupon by looking at the member's mobile phone to see that it indicates that the digital coupon has been redeemed and now displays the other information, such as time of redemption 206, time since redemption 207, reference number 204 and a sequence number 205 that has been incremented by one since the last digital coupon was redeemed. The member website (i.e., the user website) provides a web page to members where digital coupons are listed, both redeemed and unredeemed. The venue bartender may ask the member to use the member's mobile phone to go to such web page and select the digital coupon presented to the venue bartender to compare it with the previously displayed digital coupon.

If the venue bartender desires further confirmation that the tendered digital coupon is authentic and valid, the venue bartender may access the venue website (i.e., award provider website) that records all digital coupons redeemed at the venue. The venue bartender may compare the details of the redeemed digital coupon displayed on the venue's private portion of the computer server, including the 5-digit reference number 204, the 5-digit sequence number 205, redemption time 206 and time since redemption 207, to verify the details match the details displayed on the member's mobile phone.

The venue bartender may still further confirm the validity of a redeemed digital coupon 203 by instructing the redeeming member to select the "Verify" link 209 associated with the redeemed digital coupon, and enter the venue bartender's validation extension number 210. The mapping between the validation extension number and venue bartender's mobile phone number is specified on the venue website, and thus it is not known to others who might potentially try to create an unauthorized or counterfeit digital coupon. Selecting the Verify link 209 followed by the validation extension number 210 typically causes the social networking organization computer server to send a text message containing the redemption details to the venue bartender's mobile phone. In addition to, or in place of, sending a text message, the social networking organization computer server may send a message containing redemption details via an email, a fax or make an automated voice call. Such redemption verification details typically include details of the digital coupon offer, the reference number 204, the sequence number 205, the time of redemption 206, the time since redemption 207 and optionally identifying information concerning the redeeming member. Such optional identifying information may include, but is not limited to, demographic information such as age, gender, hair color, eye color, height, picture and name.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A system for performing a marketing campaign for a product vendor having two phases: (1) a specification phase, and (2) a validation phase, wherein said marketing campaign is directed to mobile-communication-device users who are members of a social networking organization to encourage said members to obtain a product from said product vendor, optionally during a specified time period, said organization maintaining data of said members using a data processor, said data processor further including an account for each member, wherein an instrument associated with said marketing campaign is provided to said members, said system comprising:
- a data processor having data comprising information of said members and the marketing campaign;
- a mobile communication device having a display associated with said member;
- said data processor originating said instrument, a reference designator, a sequence designator, time of redemption and time from redemption for display on said mobile communication device;
- said specification phase comprising:
- said product vendor selecting from a menu comprising timing aspects and nature of an offer and optionally member demographics and member behavior to provide a targeted offer, said timing aspects including at least one of (a) the day and arbitrary time said targeted offer is provided, (b) the day and arbitrary time said targeted offer becomes valid, and (c) the day and arbitrary time said targeted offer stops being valid;
- providing said targeted offer as an instrument to said member's account;
- whereby said member can access said instrument using said member's account; and
- said validation phase comprising:
- transmitting to said data processor redemption of said instrument, whereby said instrument is assigned a sequence designator, time of redemption, time from redemption; and
- displaying at least one of (a) said sequence designator, (b) said time of redemption, and (c) said time from redemption on said display of said mobile communication device.

2. A system according to claim 1, wherein a request to verify said instrument is selected on said mobile communication device, and said data processor transmitting said sequence designator to said product vendor.

3. A system according to claim 1, wherein a request to verify said instrument is selected on said mobile communication device, and said data processor sending said sequence designator to said product vendor.

4. A method for performing a marketing campaign of a venue wherein said marketing campaign is directed to mobile communication device users who are members of a social networking organization to encourage said members to attend said venue, optionally during a specified time period, said organization maintaining data of said members in a data processor, said data processor further including an account for each member, said method comprising:
- said venue selecting from a menu comprising timing aspects and nature of an offer and optionally member demographics and member behavior to provide a targeted offer, said timing aspects including at least one of (a) the day and arbitrary time said targeted offer is provided, (b) the day and arbitrary time said targeted offer becomes valid, and (c) the day and arbitrary time said targeted offer stops being valid;
- said data processor originating a digital coupon from said targeted offer;
- providing said digital coupon to said member's account;
- whereby said member can access said digital coupon using said member's account.

5. A method according to claim 4, wherein said menu includes said member demographics and said member behavior.

6. A method according to claim 4, wherein said access is through mobile communication devices.

7. A method according to claim 4, wherein said menu further includes social status of said members.

8. A system for validating the proper use of an instrument presented on a mobile communication device by a device user who is a member of a social networking organization, where said instrument is associated with a marketing campaign giving awards to members upon presentation of said instrument to an award provider and redeeming of said instrument, said system comprising:
- a data processor having data comprising information of said members and the marketing campaign;
- a mobile communication device having a display associated with a member;
- said data processor originating said instrument, a reference designator, a sequence designator, time of redemption and time from redemption for display on said mobile communication device;
- said validation comprising:
- transmitting to said data processor redeeming of said instrument, whereby said instrument is assigned a sequence designator, time of redemption, time from redemption; and
- displaying at least one of (a) said sequence designator, (b) said time of redemption, and (c) said time from redemption on said display of said mobile communication device.

9. A system according to claim 8, wherein a request to verify said instrument is selected on said mobile communication device, said sequence designator is a number, and said data processor sending said number to said award provider.

10. A system according to claim 9, wherein said number begins with a random number.

11. A system according to claim 2, wherein said sequence designator begins with a random number.

12. A system for verifying the proper use of an instrument presented on a mobile communication device by a device user who is a member of a social networking organization, where said instrument is associated with a marketing campaign giving awards to members upon presentation of said instrument to an award provider and redeeming of said instrument, said system comprising:
- a mobile communication device having a display associated with a member;
- a provider communication device associated with an award provider;
- a data processor having data comprising (a) contact information of said provider communication device, and (b) the relationship between said contact information and an indicator displayed on said mobile communication device, wherein said relationship is not provided to said members;
- said verifying comprising:
- selecting said indicator displayed on said mobile communication device, and providing said selecting to said data processor; and said data processor using said selecting with said relationship to determine said contact information to use to provide verification to said provider communication device.

13. A system according to claim 12, wherein said verification is transmitted to said provider communication device via text message, email, fax, or automated voice call.

14. A system according to claim 12, wherein said provider communication device is a mobile phone and said contact information is a mobile phone number.

15. A system according to claim 12, wherein said verification comprises at least one of (a) at least a portion of said member's information, (b) time of redemption, (c) time since redemption, (d) a reference designator, and (e) a sequence designator.

16. A system according to claim 12, said indicator displayed on said mobile communication device after redeeming said instrument, and said verification comprising redemption verification.

* * * * *